United States Patent
Miklos

(10) Patent No.: US 8,417,243 B2
(45) Date of Patent: Apr. 9, 2013

(54) ENHANCED RELIABILITY OF SERVICE IN MOBILE NETWORKS

(75) Inventor: Gyorgy Miklos, Pilisborosjeno (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 138 days.

(21) Appl. No.: 12/909,299

(22) Filed: Oct. 21, 2010

(65) Prior Publication Data

US 2012/0100848 A1   Apr. 26, 2012

(51) Int. Cl.
*H04W 48/18* (2009.01)
*H04W 8/02* (2009.01)

(52) U.S. Cl. ............. 455/435.2; 455/432.1; 455/434; 370/328

(58) Field of Classification Search .......... 370/328, 370/329, 331, 338, 310.2, 401; 455/411, 455/422.1, 426.1, 432.1, 434, 435.1–435.3, 455/436–438, 442–443
See application file for complete search history.

(56) References Cited

U.S. PATENT DOCUMENTS

| | | | |
|---|---|---|---|
| 6,463,286 B1 * | 10/2002 | Salminen .................. | 455/453 |
| 6,826,414 B1 * | 11/2004 | Reynolds et al. ........... | 455/555 |
| 2007/0066273 A1 * | 3/2007 | Laroia et al. .............. | 455/343.2 |
| 2010/0105380 A1 * | 4/2010 | Attar et al. ................ | 455/434 |
| 2010/0167755 A1 * | 7/2010 | Kim et al. ................. | 455/456.1 |

FOREIGN PATENT DOCUMENTS

WO    WO 02/073993    9/2002

OTHER PUBLICATIONS

European Search Report mailed Dec. 8, 2011 in corresponding European Application No. 11006180.1.
C. Kappler et al., "Dynamic Network Composition for Beyond 3G Networks: a 3GPP Viewpoint", IEEE Network, vol. 21, No. 1, Jan. 1, 2007, pp. 47-52, XP011168546.
3GPP TS 22.011 V9.4.0 (Jun. 2010) Release 9, pp. 1-24.
3GPP TS 23.122 V9.4.0 (Sep. 2010) Release 9, pp. 1-41.
3GPP TS 23.234 V9.0.0 (Dec. 2009) Release 9, pp. 1-84.
3GPP TS 23.251 V9.2.0 (Mar. 2010) Release 9, pp. 1-20.
3GPP TS 23.401 V9.6.0 (Sep. 2010) Release 9, pp. 1-259.
3GPP TS 23.402 V9.6.0 (Sep. 2010) Release 9, pp. 1-200.

* cited by examiner

*Primary Examiner* — Jinsong Hu
*Assistant Examiner* — Erica Navar
(74) *Attorney, Agent, or Firm* — Nixon & Vanderhye P.C.

(57) ABSTRACT

The technology described in this application increases the reliability of mobile networks. A radio communications node broadcasts a primary radio network code that indicates that subscribed mobile user equipment terminals may obtain service from a primary PLMN operator. In certain circumstances, the node may receive an instruction to broadcast a standby radio network code during a standby mode of operation. During the standby mode of operation, second mobile user equipment terminals that are not subscribed may obtain radio communications service from the primary PLMN operator.

21 Claims, 10 Drawing Sheets

ENHANCED RELIABILITY OF SERVICE IN MOBILE NETWORKS

TECHNICAL FIELD

The technical field relates to radio and/or wireless communications, and more particularly, to improving the reliability of radio and/or wireless communications service.

BACKGROUND

The ubiquitous nature of mobile networks makes their reliability crucial as society grows increasingly dependent on the mobile service provided to billions of users. While the service provided by mobile networks may be used for private communication purposes, other purposes such as, business, health, education, and the like may also rely on the constant connectivity offered by mobile networks. Accordingly, it may be a jarring experience for businesses and individuals if they lose connectivity to a mobile service.

In a typical cellular radio system (e.g., a mobile network), wireless terminals (also known as mobile stations and/or user equipment units (UEs)) communicate via a radio access network (RAN) to one or more core networks. The RAN covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air on radio frequencies with the UEs within range of the base stations.

In some versions of a radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

Typically mobile networks are designed with some degree of redundancy. For example, the loss of one base station might not affect the overall service provided by a network. However, more pervasive failures caused by human error, natural disasters (e.g., a tsunami), or man-made disasters (e.g., a military conflict) may happen. In such instances the loss of network resources may impact the service provided to UEs. The loss of network resources and mobile service may be more pronounced in an emergency situation (e.g., a natural disaster) where such mobile service may play a vital role for emergency personnel.

In certain instances, there may be multiple mobile networks in a particular geographic location. A first mobile network may fail in the location, but other mobile networks may still be operational at the same location. Yet, subscribed UEs of the affected mobile network may not be able to obtain service from the other mobile networks to which they do not subscribe.

As an example, in 2005, hurricane "Gudrun" in southern Sweden brought down multiple base stations. The inoperability of certain base stations caused service disruptions for some users. However, while base stations for certain mobile operations were inoperable in certain areas, in many areas, at least one mobile network operator had an operable base station. Accordingly, even though there may have been an operable base station (with an associated mobile network operator) within range of an otherwise "stranded" mobile subscriber, the subscriber may not have been able get service from that mobile network operator.

One reason "stranded" mobile subscribers may not obtain service from other mobile network operators is a lack of national roaming agreements between mobile operators. National roaming agreements may allow users to roam between different operators in the same country. However, in practice certain mobile operators may be reluctant to make such national roaming agreements due to business reasons. For example, mobile network operators may choose to compete on the quality of coverage they provide in a given country.

Where there are no national roaming agreements, one possible workaround might be to use a SIM card from another country. An international roamer could select any of the local networks whenever at least one is available. However, the option of using an international SIM card may not be available for every mobile subscriber. Moreover, such a solution may not work for local inhabitants affected by a hurricane who may need immediate communications service.

Accordingly, some level of cooperation among mobile network operators may be needed. Indeed there may be reasons for mobile operators to cooperate in such emergency situations. First, government entities may provide incentives for cooperation. Second, outages in coverage may affect the economic viability of a company that runs a mobile network. Third, cooperation among operators may decrease the overall cost of providing high reliability mobile service for subscribers. Mobile network operators may realize that multiple networks on essentially the same national coverage area can provide inherent reliability for network failures. Conversely, achieving the same level of reliability within a single mobile network may require an extreme degree of redundancy with a correspondingly high price tag. Accordingly, the aggregate reliability of national mobile operators may provide an economic justification for the operators to cooperate.

Cooperation between national mobile operators may take various forms. One approach may be an emergency-only national roaming agreement, (e.g., one that is only invoked when there is some substantial network failure). However, such an approach may be possible only if the necessary business and legal agreements have been made ahead of time. Further, there may be additional problems with such a solution.

First, the UEs may be configured in such a way that the other networks are marked as forbidden such that the UE may not select other networks independent of any prior standard roaming agreements. Second, reprogramming UEs (e.g., by redefining a forbidden public land mobile network (PLMN) list, or using a steering of roaming feature to direct the terminal to (or away from) a specific PLMN) on the fly during an emergency situation may not be viable because: 1) a mass reconfiguration of all connected UEs may further congest the mobile network; and 2) the UEs not connected (and thus in need of connectivity the most) may not receive the reconfiguration instructions.

It will be appreciated that emergency calling (e.g., 911) may ignore even forbidden networks. However, emergency calling may be only a very limited service. Disconnected users may want to have all the communication services provided by their normal service (e.g., to call families, access the internet, get the latest news, etc). Furthermore, usage of emergency call services may present a new problem if people in a disaster area can only access emergency numbers. This may lead to people calling the emergency number for non-emergency situations (e.g., to get information, etc). Accordingly, this may increase the call burden to emergency call centers during a situation such as hurricane Gudrun.

Thus, it will be appreciated that the current methods are not sufficient. Accordingly, it would be desirable to provide a method and/or system of increasing mobile network reliability.

SUMMARY

The technology described in this application provides techniques to improve mobile communications service reliability. A radio communications node in a first radio communications network is operated by a primary public land mobile network (PLMN) operator that provides radio communications service to first mobile user equipment terminals subscribed to the primary PLMN operator during a first normal mode of operation. The radio communications node includes radio circuitry that broadcasts a primary radio network code associated with the primary PLMN operator. The primary radio network code indicates that first mobile user equipment terminals may obtain service from the primary PLMN operator. The radio communications node also includes a receiver configured to receive an instruction to broadcast a standby radio network code. A second different PLMN operator provides radio communications service during the first normal mode of operation to second mobile user equipment terminals subscribed to the second PLMN operator. The second mobile user equipment terminals are substantially not allowed to obtain service from the primary PLMN operator during the first normal mode of operation. The receiver, in response to the received instruction, enters a standby mode of operation and causes the radio circuitry to broadcast both the primary radio network code and the standby radio network code to permit one or more of the second mobile user equipment terminals to obtain radio communications service from the primary PLMN operator during the standby mode of operation.

A feature of a non-limiting example embodiment is that the communications service for the primary PLMN operator includes using first radio resources allocated to the primary radio network operator and the communications service from the second PLMN operator includes using second radio resources that are at least partially different from the first radio resources.

Another feature of a non-limiting example embodiment is where the second PLMN operator operates a second radio communications network, and the standby mode of operation corresponds to an emergency situation where one or more radio communications nodes in the first radio communications network and/or in the second radio communications network are no longer available.

A further feature of a non-limiting example embodiment is that the standby radio network code is associated with a standby PLMN identifier.

A feature of a non-limiting example embodiment is mobility management circuitry that coordinates mobility during the standby mode of operation to facilitate handover of ongoing mobile user equipment terminal communications between at least one communication node of the primary PLMN operator and at least one communication node of the second PLMN operator.

Another feature of a non-limiting example embodiment is the second PLMN operator operating a second radio communications network, and wherein the first and second radio communications networks are logical networks.

A further feature of a non-limiting example embodiment is the second PLMN operator operating a second radio communications network that is a different type of radio access technologies.

A feature of a non-limiting example embodiment is that the standby radio network code is an emergency indicator flag that instructs second mobile user equipment terminals to override a standard radio communications network selection process.

In another non-limiting example embodiment, a controller node interacts with a first radio communications network operated by a primary PLMN operator to communicate with at least one radio communications node of the first radio communications network. The one radio communications node broadcasts a primary radio network code associated with the primary PLMN operator during a normal operational mode. The controller node includes a communications interface that sends an instruction to the one radio communication node to enter a standby mode and to broadcast a standby radio network code. The primary PLMN operator provides radio communications service during the normal operational mode to first mobile user equipment terminals that are primary PLMN operator subscribers. A second PLMN operator provides radio communications service during the normal operational mode to second mobile user equipment terminals that are second PLMN operator subscribers. The second mobile user equipment terminals are excluded from substantially obtaining the radio communications service of the primary PLMN operator during the normal operational mode but are allowed to access the radio communications service of the primary PLMN operator during the standby mode.

A feature of a non-limiting example embodiment is a communications network fault determiner that automatically sends instructions to at least one radio communication node when a fault is detected in the first radio communications network.

Another feature of a non-limiting example embodiment is where communications interface is adapted to send an instruction to substantially all radio base station nodes within the first communications network to enter the standby mode.

A further feature of a non-limiting example embodiment is an external interface that sends a request to the second PLMN operator to activate a second standby mode to broadcast a second standby code and the first mobile user equipment terminals are allowed to access a second radio communications service of the second PLMN operator during the second standby mode.

A feature of a non-limiting example embodiment is that the controller node is located in an O&M node, a core network node, or a radio network control node In a further non-limiting example embodiment, a method of increasing reliability of access to a radio communications network for mobile user equipment terminals is provided. A first primary radio network code associated with a first PLMN operator that provides radio communications service to first mobile user equipment terminals subscribed to the first PLMN operator is established. The first PLMN operator operates a first radio communications network. A standby radio network code associated with the first PLMN operator and related to a second PLMN operator is established. The second PLMN operator operates a second radio communications network and provides radio communications service to a set of second mobile user equipment terminals subscribed to the second radio communications provider. The first primary radio network code is broadcast. A standby mode is activated. The standby radio network code is broadcast in response to the standby mode being activated. Service to the first PLMN operator for the second mobile user equipment terminals is substantially denied when the standby mode is inactive. Service from the first PLMN operator is provided for the second mobile user equipment terminals when the standby mode is active.

A feature of a non-limiting example embodiment is automatically controlling the activation of the standby mode.

Another feature of a non-limiting example embodiment is activating the standby mode automatically when a predetermined percentage of network nodes in the first radio communications network become inoperative.

A further feature of a non-limiting example embodiment is, in response to activating the standby mode, the first PLMN operator sends a request to the second PLMN operator to broadcast a second standby code and the second standby code facilitates first mobile user equipment terminals obtaining service from the second PLMN operator.

A feature of a non-limiting example embodiment when activating the standby mode is done in response to a request from the second PLMN operator to activate the standby mode Another feature of a non-limiting example embodiment is when the first communications network includes a first core network component and a first radio access network component, and the standby radio network code is associated with a standby core network component that is at least partially separate from the first core network component A further feature of a non-limiting example embodiment is where the standby core network is logically separate from the first radio communications network, but is substantially physically the same as the first radio communications network.

Additional features and/or advantages may be realized in certain non-limiting example embodiments. For example, during bigger network failures, users may continue to obtain communications service if at least one of the networks continues to function, thereby increasing the reliability of service.

National roaming may be restricted to emergency situations. Accordingly, regular business practices may be maintained in normal circumstances (e.g., when a standby PLMN is not active).

As users may be able to access a communication service, emergency call centers may be relieved from calls that are not emergency-related. Accordingly, emergency call centers may become more efficient when they are needed most (e.g., during emergencies).

An operator that provides a standby PLMN feature may be able to charge other operators for the services it provides for inbound roamers. This charge may be settled in a roaming agreement, and may be higher than normal roaming charges. Accordingly, an operator with a reliable network may obtain extra revenue.

DETAILED DESCRIPTION

Figure 1A:
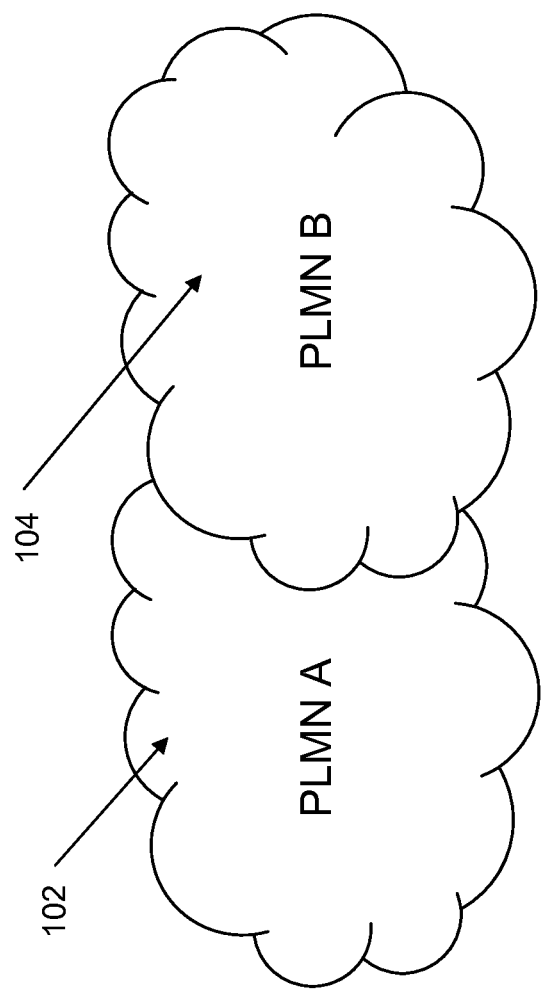
FIG. 1A illustrates a non-limiting example diagram of two network operators with overlapping coverage areas.

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in a non-transitory computer readable medium and so executed by a computer or processor, whether or not such computer or processor is explicitly shown.

The functions of the various elements including functional blocks, including but not limited to those labeled or described as "computer", "processor" or "controller" may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC), and (where appropriate) state machines capable of performing such functions.

In terms of computer implementation, a computer is generally understood to comprise one or more processors, or one or more controllers, and the terms computer and processor and controller may be employed interchangeably herein. When provided by a computer, processor, or controller, the functions may be provided by a single dedicated computer, processor, or controller, by a single shared computer, processor, or controller, or by a plurality of individual computers, processors, or controllers, some of which may be shared or distributed. Moreover, use of the term "processor" or "controller" shall also be construed to refer to other hardware capable of performing such functions and/or executing software, such as the example hardware recited above.

The technology may be used in any type of cellular radio communications. For ease of description, the term user equipment (UE) encompasses any kind of radio communications terminal/device, mobile station (MS), PDAs, cell phones, laptops, etc.

Referring now more particularly to the drawings in which like reference numerals indicate like parts throughout the several views. FIG. 1A illustrates a non-limiting example diagram of two network operators with overlapping mobile network coverage areas. As shown, Public Land Mobile Network (PLMN) A 102 and PLMN B 104 have coverage areas that geographically overlap.

Figure 1B:
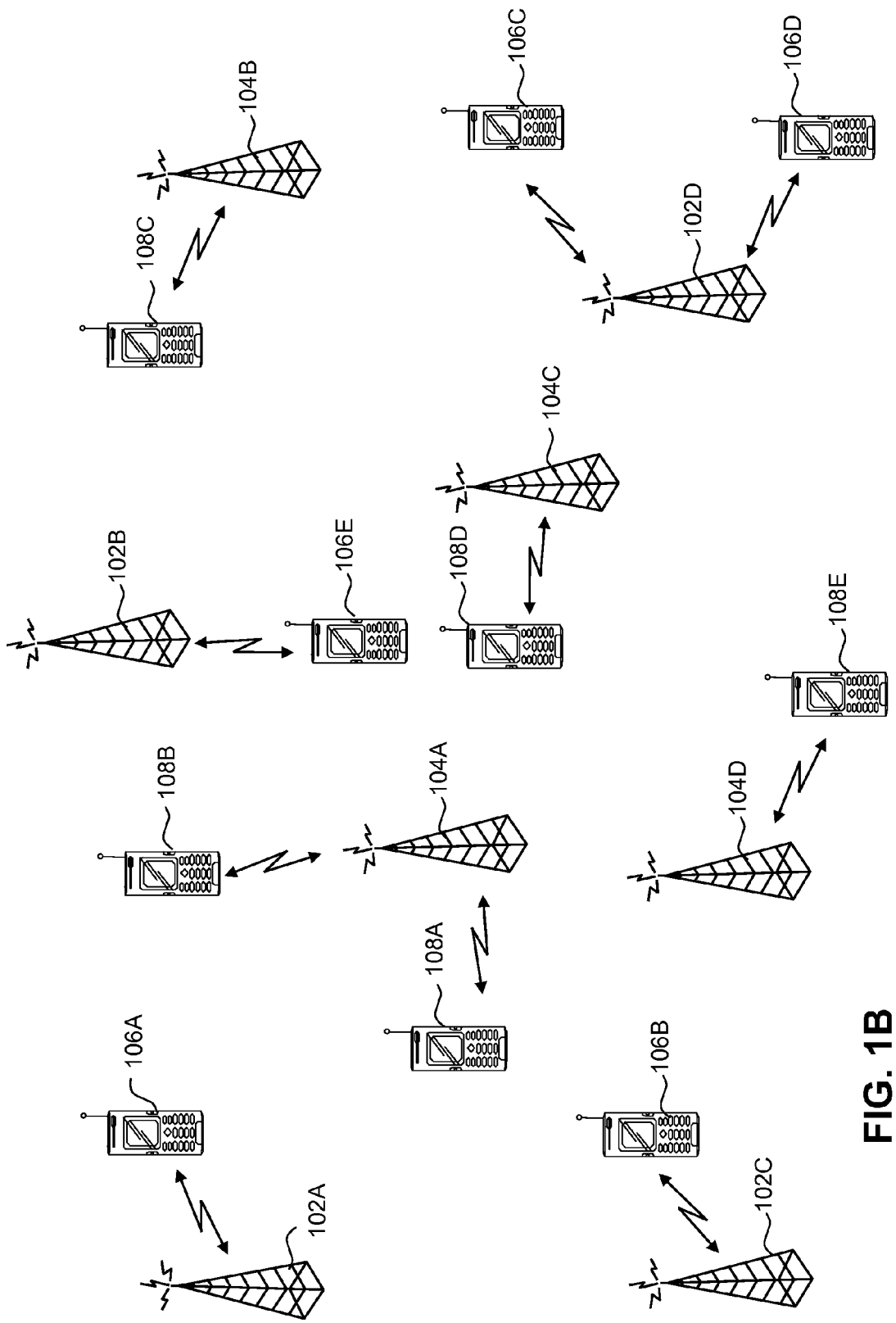
FIG. 1B illustrates another non-limiting diagram of two network operators servicing their respective subscribers.

FIG. 1B illustrates another non-limiting diagram of two network operators servicing their respective subscribers. Base stations 102A, 102B, 102C, and 102D (e.g., NodeBs) facilitate mobile radio communications for PLMN A 102. UEs 106A, 106B, 106C, 106D, and 106E may be user equipment devices that are subscribed and obtain service from PLMN A 102. The individual UEs may obtain service through a base station that facilitates mobile communications service with a given geographical area. Accordingly, UE 106A obtains service (e.g., over allocated radio resources through techniques such as TDM or FDM) through base station 102A; UE 106B obtains service through base station 102C; UE 106C obtains service through base station 102D; UE 106D obtains service through base station 102D; and UE 106E obtains service through base station 102B.

Similarly, UEs 108A, 108B, 108C, 108D, and 108E are subscribed to and obtain service from PLMN B 104. Accordingly, UE 108A obtains service through base station 104A; UE 108B obtains service through base station 104A; UE 108C obtains service through base station 104B; UE 108D obtains service through base station 104C; and UE 108E obtains service through base station 104D.

Figure 2A:
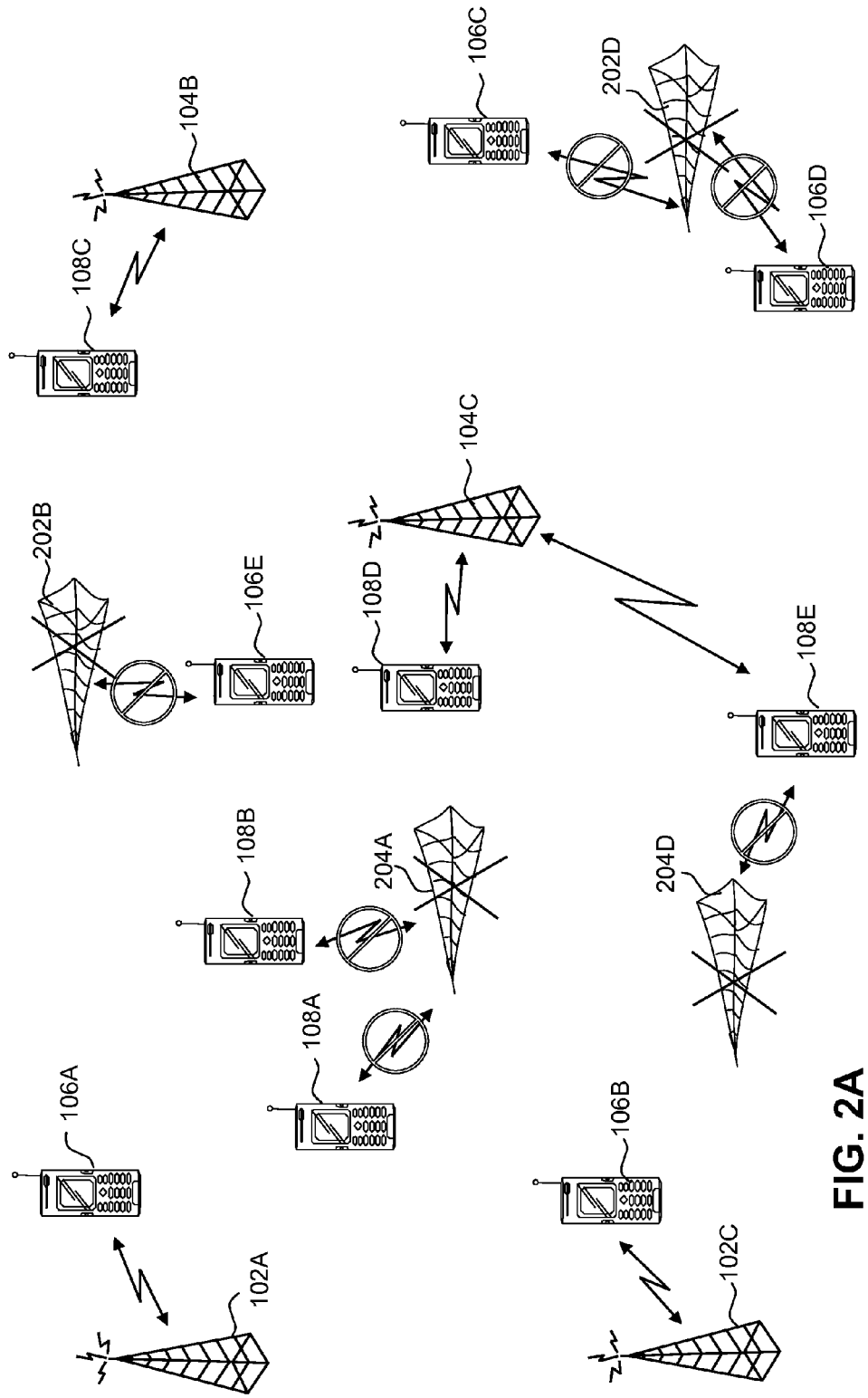
FIG. 2A illustrates a non-limiting diagram of two network operators servicing their respective subscribers after some base stations are rendered inoperable.

FIG. 2A illustrates a non-limiting diagram of the two network operators shown in FIG. 1B servicing their respective subscribers after some base stations are rendered inoperable (e.g., because of a disaster). As shown in FIG. 2A, base stations 104A, 102B, 102D, and 104D of FIG. 1B are inoperable and now referred to as downed base stations 204A, 202B, 202D, and 204D. As these base stations of PLMN A and PLMN B's network are now down, some of their respective UE subscribers may not be able to receive service. Specifically, UEs 108A and 108B no longer able to obtain service as downed base station 204A is inoperable. Furthermore, UEs 108A and 108B may not be in range of any other operable base stations that are operated by PLMN B (e.g., 104C). Similarly, downed base station 202B is unable to provide service to UE 106E. As there are no operable base stations with range of UE 106E that are operated by PLMN A, UE 106E is not able to obtain mobile service from PLMN A. Likewise, the disabling of base station 202D may cut service from UEs 106C and 106D. Similar to the previous UEs, there may be no base stations operated by PLMN A within range that are able to provide service to these UEs.

Downed base station 204D may not be able to provide service to UE 108E. However, unlike the previous UEs, UE 108E is within range of another base station operated by PLMN B. Accordingly, UE 108E may obtain service from another active base station 104C and thus avoid a service interruption.

Figure 2B:
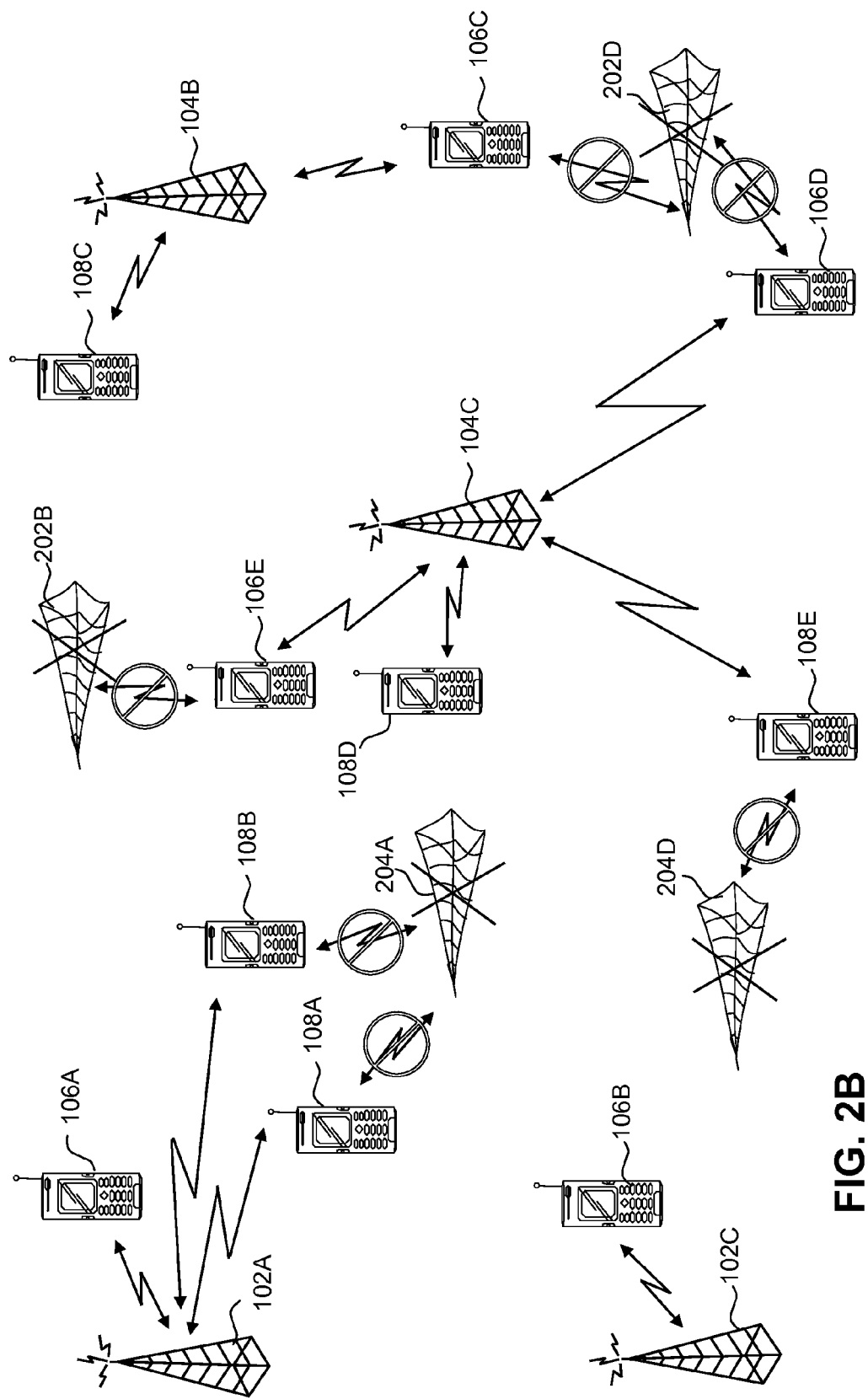
FIG. 2B illustrates another non-limiting diagram of two network operators after some base stations are rendered inoperable, with some subscribers obtaining service from an alternative network operator.

FIG. 2B illustrates another non-limiting diagram of two network operators after some base stations are rendered inoperable, with some subscribers obtaining service from an alternative non-subscribed network operator according to a non-limiting example embodiment. As with FIG. 2A, UEs 108A, 108B, 106E, 106C, and 106D are not able to obtain mobile service from their respective PLMN operators because of downed base stations 204A, 202B, 202D, and 204D. The lack of an operable base station within range of the UEs may "cut" them off from mobile service altogether. However, while there may not be any operable base stations operated by their respective PLMN operators within range, there may be base stations operated by other non-subscribed PLMN operators within range.

As discussed above, absent a predefined roaming agreement between different PLMN operators, UEs subscribed to one PLMN operator may mark other PLMN operators to which the UEs are not subscribed as "forbidden." In a non-limiting example embodiment, base stations operated by PLMN operators may broadcast a network code (e.g., a PLMN ID where a PLMN ID may be a Mobile Country Code (MCC) plus a Mobile Network Code (MNC)). The broadcast network code identifies the PLMN operator that the base station is associated with (however, as discussed below, a base station may be associated with more than one PLMN operator, code, etc). Thus, each of the base stations broadcasts a network code. UEs then perform a network code (e.g., PLMN id) selection procedure to decide which of the base stations that the UE will obtain service from that is operated by its subscribed PLMN operator. It will be appreciated that the described selection process may be automatic, manual, pre-programmed, etc. In some non-limiting example embodiments, the selection process may be a pre-programmed process where only approved operators (e.g., a subscribed operator or an operator with a roaming agreement), and their associated base stations, are candidates for selection by a UE during the UE selection process.

FIG. 2B shows UEs 108A, 108B, 106E, 106C, and 106D are now connected to base stations not operated by their respective subscribed PLMN operator. As discussed above, individual base stations may broadcast network codes (e.g., a PLMN id) that identify which subscribed UEs operators may obtain service from each base station. For example, during a normal mode of operation base station 102A broadcasts a PLMN code that is directly associated with PLMN operator A. Thus, a UE (e.g., UE 106A) that may be subscribed to operator A may recognize the broadcast network code and attempt to obtain service from base station 102A. Other UEs (e.g., UEs 108A or 108B) that are not subscribers or not otherwise able to obtain service from PLMN operator A may also receive the broadcast network code. However, unlike a subscribed UE, these non-subscribed UEs may have the broadcast network code marked as forbidden. Accordingly, non-subscribed UE's are not able to obtain service from base stations where the broadcast network code is marked as forbidden.

In a non-limiting example embodiment, a base station may selectively broadcast both its regular (e.g., primary) PLMN code and a standby PLMN code during a standby mode. In the example above, base station 102A broadcasts a network code directly associated with PLMN Operator A informing PLMN Operator A UE subscribers (e.g., UE 106A) that mobile service is available from base station 102A. However, in FIG. 2B base station 102A also broadcasts a second standby network code (e.g., a standby PLMN id). The standby network code (discussed in more detail below) may be selectively broadcast by a base station (e.g., base station 102A may begin broadcasting the standby network code in response to the failure of base station 204A).

The second standby network code may alert other non-subscribed UEs that they may obtain service from base station 102A through PLMN Operator A. Furthermore, in certain example embodiments, the second standby network code may not be marked as forbidden by the non-subscribed UEs. Accordingly, non-subscribed UEs may add the second standby network code to their selection procedure for obtaining mobile communications service. For example, the second standby network code broadcast by base station 102A may be received by UEs 108A and 108B. As UEs 108A and 108B may be within range of base station 102A, the UEs may add the second standby network code (and its associated base station and PLMN Operator) to their selection process. As base station 102A is the only operational base station within range, UEs 108A and 108B obtain service from base station 102A. As can be seen in FIG. 2B, unsubscribed UEs 108A and 108B establish a radio connection via base station 102A to obtain service through Operator A. Similarly, base station 104C and base station 104B broadcasts standby network codes. Accordingly, UEs 106E, 106D, and 106C may attempt to obtain service from the base stations now broadcasting standby network codes.

It will be appreciated that in certain non-limiting example embodiments, an operator whose base stations transmit a standby network code may impose certain restrictions on the use of the PLMN associated with the standby network code. These special policy rules may apply limits to traffic so that congestion may be avoided. Further, different thresholds may apply to UEs obtaining service through a standby network code versus UEs obtaining service through a regular or normal network code. Furthermore, operators may define special classes of subscribers and differentiate them (e.g., governmental agencies may get a higher traffic quota).

Certain non-limiting example embodiments of a communications network may include a controller node. For example, such a controller node may provide operations and maintenance (O&M) for a mobile communications network. In some non-limiting example embodiments, a controller node may include a core network node, a radio control node, or the like.

Figure 3A:
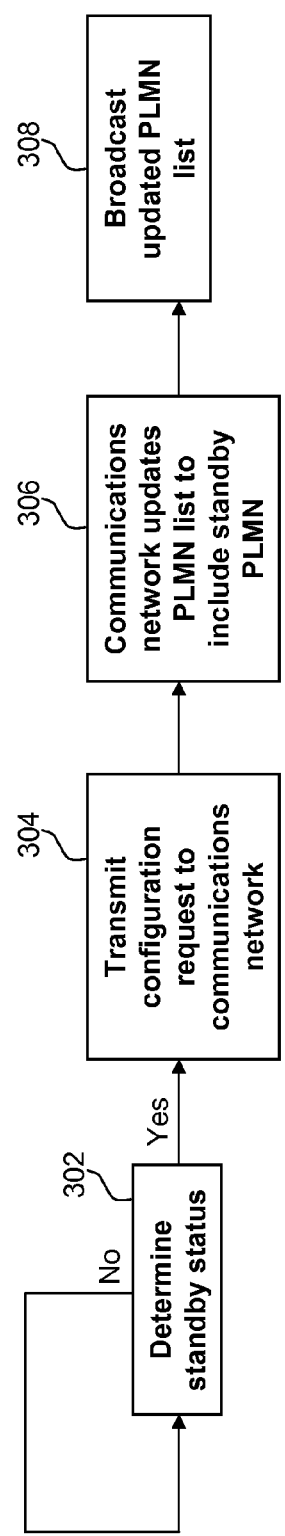
FIG. 3A illustrates a non-limiting example diagram of a controller node managing a PLMN list.

In certain example embodiments, the controller node may control when a standby network code (e.g., PLMN code) may be broadcast by base stations. FIG. 3A illustrates a non-limiting example diagram illustrating procedures performed by a controller node managing a PLMN code list. In step 302, the controller node determines the standby status of the network so as to determine whether the standby PLMN code should be activated.

One non-limiting technique for accomplishing this determination process is to have an automated process determine when the standby code may be activated. For example, a controller node interfaces with other nodes within a communications network and monitors the overall health and operational status of the network. The controller node may be able to determine, for example, a percentage of communication nodes (e.g., base stations or NodeBs) that are operational on the network (or are operational on a particular geographic portion of the communications network). If the percentage of operational nodes drops below a certain amount the controller node may, in step 302, determine "yes" that the standby status should be switched on and proceed to the step 304. However, if the automatic determination program decides "no", the controller node loops around the "no" path to check the status again.

Alternatively, or in addition to, the determination of a standby status may be an input from a terminal (e.g., a keyboard) or other user interface. Thus, operational personnel may manually determine whether or not to activate the standby status.

Once a controller node determines that a standby mode may be activated, then in step 304 the controller node transmits configuration instructions, information, etc., to the rest of the communications network. Such instructions instruct various nodes within the network that the standby mode is to be activated. For example, when the base stations in the communications network receive instructions to enter the standby mode, the PLMN code list broadcast by the base stations is updated to include a standby PLMN code.

Furthermore, the core network may be updated to include the standby PLMN as an approved PLMN for which the core network provides service. Next, in step 308, the updated PLMN list (e.g., the list updated in the RAN) may then be broadcast by the base stations in the communications network. The updated PLMN list now includes the primary PLMN code associated with the PLMN operator and the additional and newly-added standby PLMN code related to another PLMN operator. It will be appreciated that there may be various techniques for facilitating the updating and broadcasting of the standby PLMN. Such techniques may include, for example, locally storing alternate PLMN lists and switching between those lists upon request, receiving a PLMN code and dynamically adding the id to the broadcast PLMN list, storing a PLMN id locally and receiving an instruction to add the id to the list, etc.

Figure 3B:
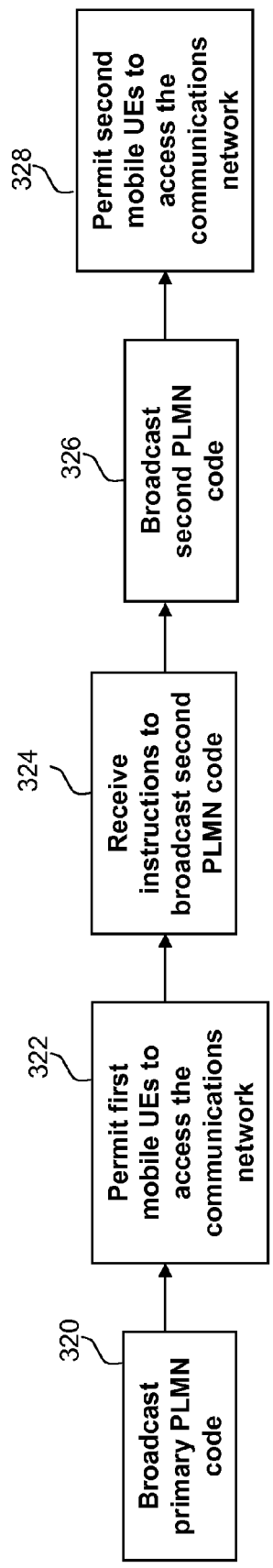
FIG. 3B illustrates a non-limiting example diagram of a communications node broadcasting a PLMN list.

FIG. 3B illustrates a non-limiting example function block diagram of a communications node (e.g., a base station) broadcasting a PLMN list. In step 320, a communication node broadcasts a primary PLMN code. This PLMN code may alert subscribed UEs that they may obtain service from the PLMN operator associated with the primary PLMN code. Thus, in step 322, first mobile UEs (subscribers of the PLMN operator) allowed to access the communications network operated by the PLMN operator that is broadcasting the primary PLMN code.

Next in step 324 the communication node receives instructions to broadcast a second PLMN code. As discussed above, such an instruction may be provided by a controller node. In any case, once the instruction is received, in step 326, a second standby PLMN code is broadcast by the communications node. The broadcasting of the second PLMN code in standby mode permits a second group of unsubscribed mobile UEs to access the communications network operated by the PLMN operator.

It will be appreciated that the second group of unsubscribed mobile UEs are not permitted to access the communications network prior to the broadcasting of the second PLMN code (e.g., during a normal operational mode). Accordingly, the broadcasting of the second PLMN code may facilitate access to the communications network for a second group of mobile UEs that are not subscribers of the PLMN operator.

Figure 4:
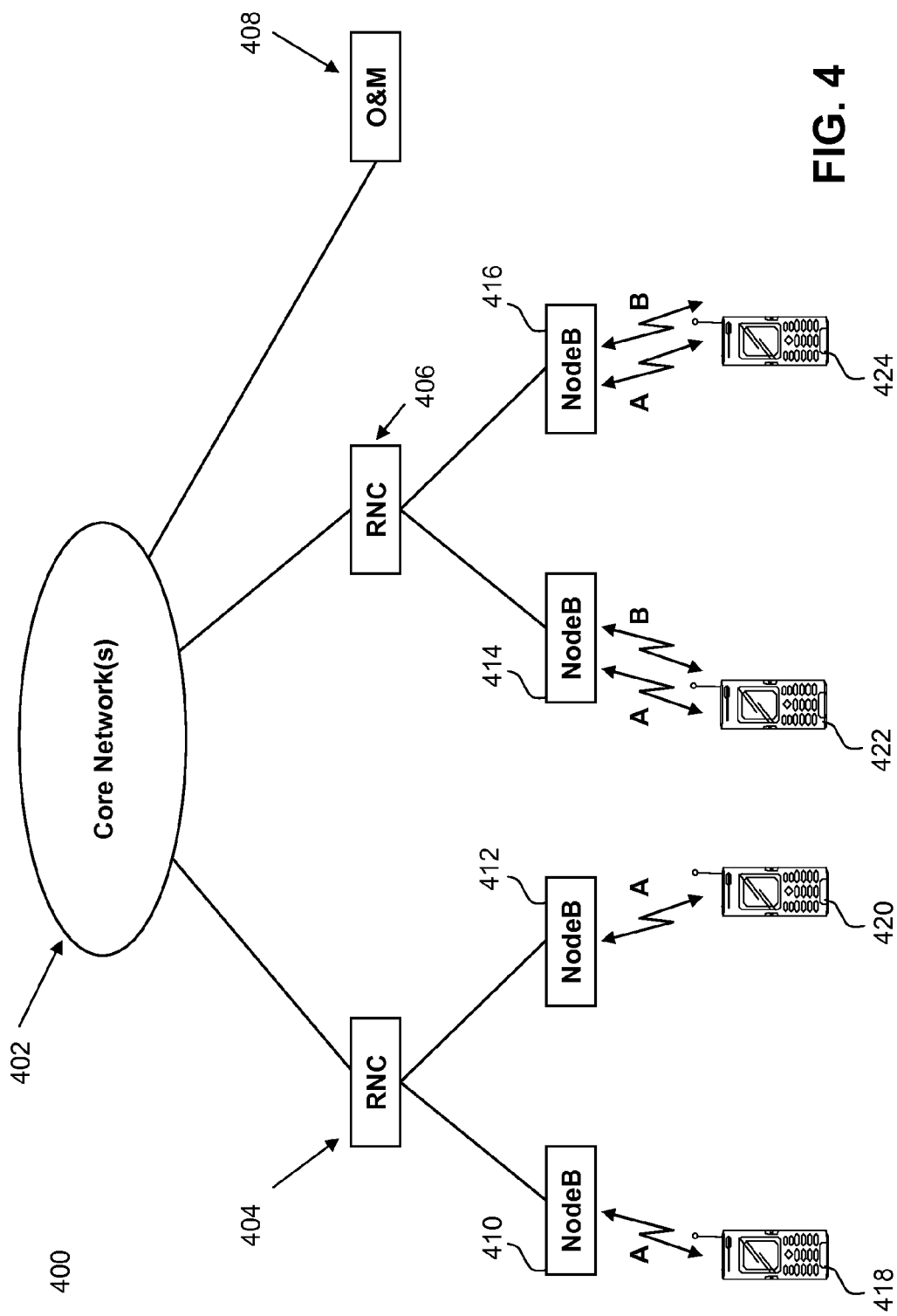
FIG. 4 is a diagram of a non-limiting example communications network.

FIG. 4 is a diagram of a non-limiting example communications network 400. The communications network 400 has subscriber UEs 418, 420, 422, and 424 and is operated by a PLMN operator (e.g., Operator A in FIG. 1) In this example, the communications network 400 includes a core network 402 and a RAN (e.g., a UTRAN) that includes RNCs 404 and 406 and NodeBs 410, 412, 414, and 416.

Core network 402 provides various core functionalities for communications network 400. It will be appreciated that core network 402 may composed of numerous separate core networks that may interface with each other. Further that such core networks may be logically and/or physically separate core networks. Such services may include, for example: 1) an authentication capability to determine whether a UE requesting a service from the communication network 400 is authorized to do so; 2) a call routing or switching functionality that directs and/or determines how calls are routed/switched within the communications network and/or other networks; and 3) links to other core networks operated by other PLMN operators. The communications network 400 includes an Operations and Maintenance (O&M) node 408 that configures, allocates, monitors, etc; the nodes in the communications network 400. The O&M node 408 may gather various statistics, such as, for example, the number of calls being handled, the number of subscribers attached to the network, the type of services being used, or the like. The O&M node 408 may then act on (e.g., through alarms, triggers, messages, etc.) the collected data and perform configuration requests on the core network 402 and/or other nodes (e.g, RNCs 404 and 406 and NodeBs 410, 412, 414, and 416) within the communications network.

The Radio Network Control (RNC) Nodes 404 and 406 communicate with the core network 402 and control NodeBs 410, 412, 414, 416. The NodeBs in turn communicate with UEs 418, 420, 422, and 424 over a radio interface.

Each NodeB also broadcasts a network code that identifies the primary PLMN network for that NodeB. As shown in FIG. 4, NodeBs 410 and 412 broadcast a network code "A" that is directly associated with a PLMN operator A. UEs 418 and 420 are subscribers of operator A. Accordingly, the broadcast of the network code "A" lets UEs 418 and 420 know that NodeBs 410 and 412 are part of a communications network that they are permitted to access because the UEs are subscribers of Operator A.

NodeBs 414 and 416 broadcast two network codes, a primary "A" code and standby "B" code, in a standby mode of operation. Accordingly, listening UEs that do not have codes "A" and "B" marked as forbidden may attempt to access communications network 400 through the above NodeBs. Specifically, UEs 422 and 424 have network code "A" labeled as a forbidden network (e.g., one that they know they are not able to access—because they are not subscribers). However, the UEs 422 and 424 also do not have network code "B" marked as forbidden and may seek to obtain service from communications network 400 through NodeBs 414 and 416.

It will be appreciated that configuration of the NodeBs for the network codes to be broadcast may be controlled by the O&M node or other similar node. Further, in other non-limiting example embodiments all NodeBs may be configured to broadcast a standby code instead of just a portion the NodeBs in a communications network.

Figure 5:
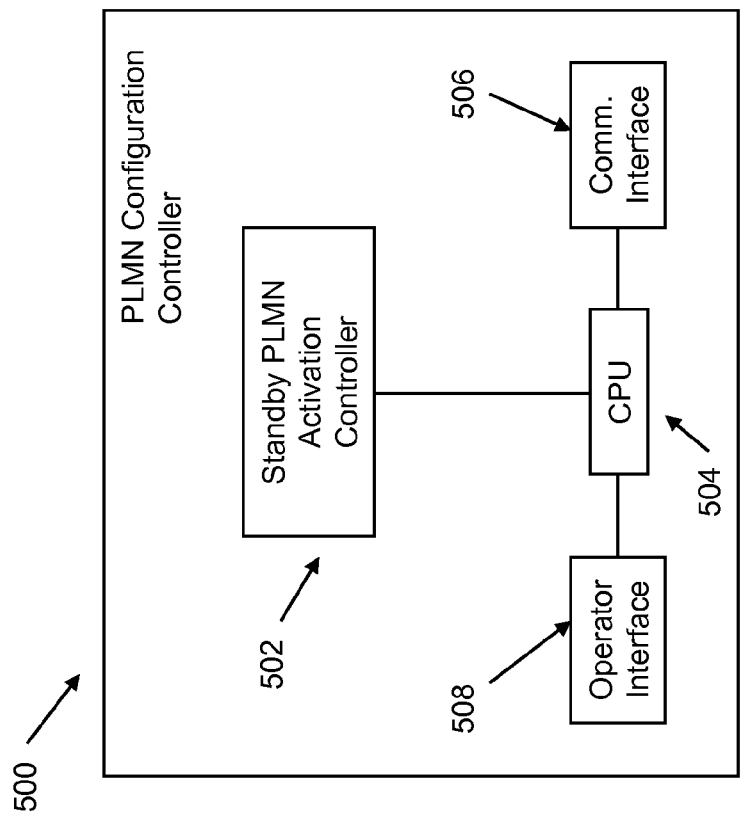
FIG. 5 is a block diagram of a non-limiting example controller node.

FIG. 5 is a block diagram of a non-limiting example controller node according to an example embodiment. PLMN configuration controller 500 includes a standby PLMN activation controller 502. Alternately, the function of the standby PLMN activation controller 502 may be performed by CPU 504. PLMN activation controller 502 determines when a standby PLMN may be activated. The PLMN activation controller 502 interfaces with a central processing unit (CPU) 504. CPU 504 may then interface with an operator interface 508. Operator interface 508 may include, for example, a keyboard, a mouse, a touch screen, or other such device that allows an operator to perform input commands. Operator interface 508 may facilitate manual decision making of when a standby PLMN may be activated.

Figure 6:
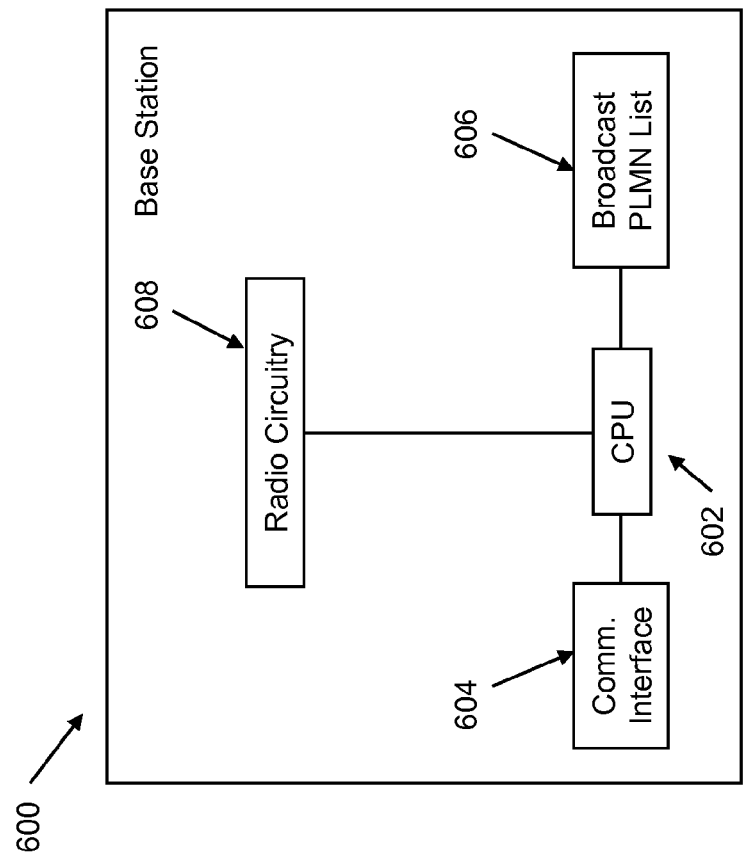
FIG. 6 is a block diagram of a non-limiting example base station.

CPU 504 also interfaces with a communications interface 506 that facilitates the communication of commands, instructions, and configuration data to nodes within a communications network (e.g., such as base station 600 in FIG. 6). Accordingly, when the PLMN configuration controller 500 decides to control the PLMN status of a communications network it communicates such commands to the rest of the communications network.

FIG. 6 is a block diagram of a non-limiting example base station according to an example embodiment. Base station 600 communicates with UEs. 418, 420, 422, and 424 in FIG. 4 over a radio interface using radio circuitry 608. The radio circuitry 608 interfaces with CPU 602. CPU 602 accepts incoming data from radio circuitry 608 (e.g., call data) and passes it on to a network communications interface 604. Alternatively, or in addition to, CPU 602 may communicate information from the communications interface 604 to CPU 602 that may then be passed on to be transmitted by radio circuitry 608. CPU 602 also interfaces with a memory that stores a broadcast PLMN list 606. The broadcast PLMN list 606 includes a list of one or more PLMN codes to be broadcast by base station 600. The CPU 602 accesses the broadcast PLMN list 606 and instructs radio circuitry 608 to broadcast the list of PLMN codes contained in the broadcast PLMN list 606.

The broadcast PLMN list may be stored in a memory medium such as, for example, volatile (e.g., RAM) or non-volatile memory (e.g., disk memory). The communications interface 604 may receive instructions from, for example, PLMN configuration controller 500, to update the broadcast PLMN list 606 with a new PLMN code (e.g., a standby PLMN code). Accordingly, CPU 602 may receive the instruction and then causes a write operation to take place that updates the broadcast PLMN list with the new PLMN code. Thus, a standby PLMN may be added to the broadcast PLMN list 606.

The switching on and off of the standby PLMN may involve the O&M system of a communications network reconfiguring the RAN nodes to start or stop advertising the standby PLMN. While such a reconfiguration may be done manually, it may be preferable if the O&M system automatically switches the standby PLMN on/off. The trigger to switch the standby PLMN on may be based on some indication of a major failure in one of the networks or a disaster that may lead to a major failure. The trigger may be manual, but may also be based on an automatic indication from the O&M system detecting a fault in the RAN, in the core network, and/or in the transport network.

The switching on or off of the standby PLMNs may be harmonized in the different networks (e.g., networks that have standby agreements in place). This may be accomplished by an offline method or automatically via a redundant communication scheme using feedback from the O&M systems. Further, an external organization, such as a governmental agency, may be used to decide when a "communication emergency situation" has arisen (e.g., when standby PLMNs may be activated).

Figure 7A:
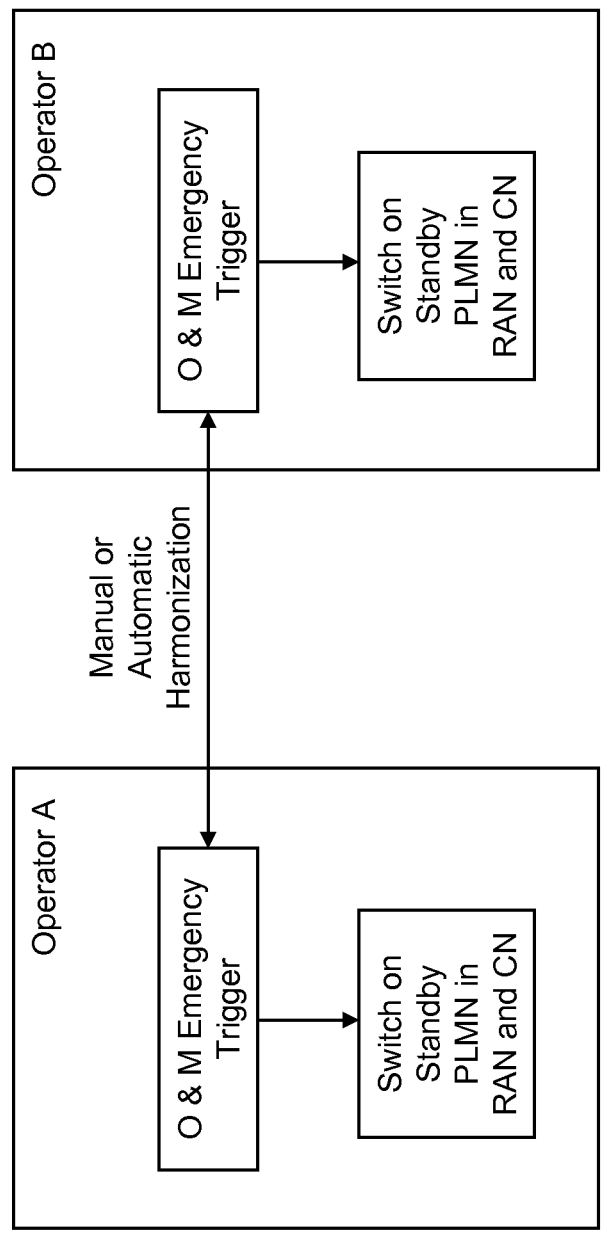
FIG. 7A is a signaling diagram illustrating one set of non-limiting example procedures between operators.

FIG. 7A is a signaling diagram illustrating one set of non-limiting example procedures between operators according an example embodiment. Operator A and Operator B may setup a procedure that activates the standby PLMNs in each of the networks operated by Operators A and B. Operator A and Operator B may set up O & M emergency triggers. As discussed above, such triggers may be manual (e.g., operator input) or automatic (e.g., based on a percentage of downed network capacity). Once the O & M emergency trigger is set off, two things may occur. First, as discussed above, the communications network may be configured to switch on a standby PLMN in the radio access network (e.g., the RAN and NodeBs of the network) and switch on the standby PLMN in the CN (e.g., core network). Second, the trigger may cause a request to be sent to the other operator (e.g., Operator B) to activate the standby PLMN in the other operator's network. Accordingly, the "trigger" for the other network may be the request from the initially triggered network. Thus, the networks of Operators A and B may be automatically harmonized based on one trigger.

Alternatively, the networks of Operators A and B may be setup to be manually harmonized. In other words, a trigger may activate the standby PLMN in Operators B's network. Then, Operator A may manually activate the O & M trigger (e.g., through personnel of Operator A manually setting off the trigger) to activate the standby PLMN in Operator A's network.

Figure 7B:
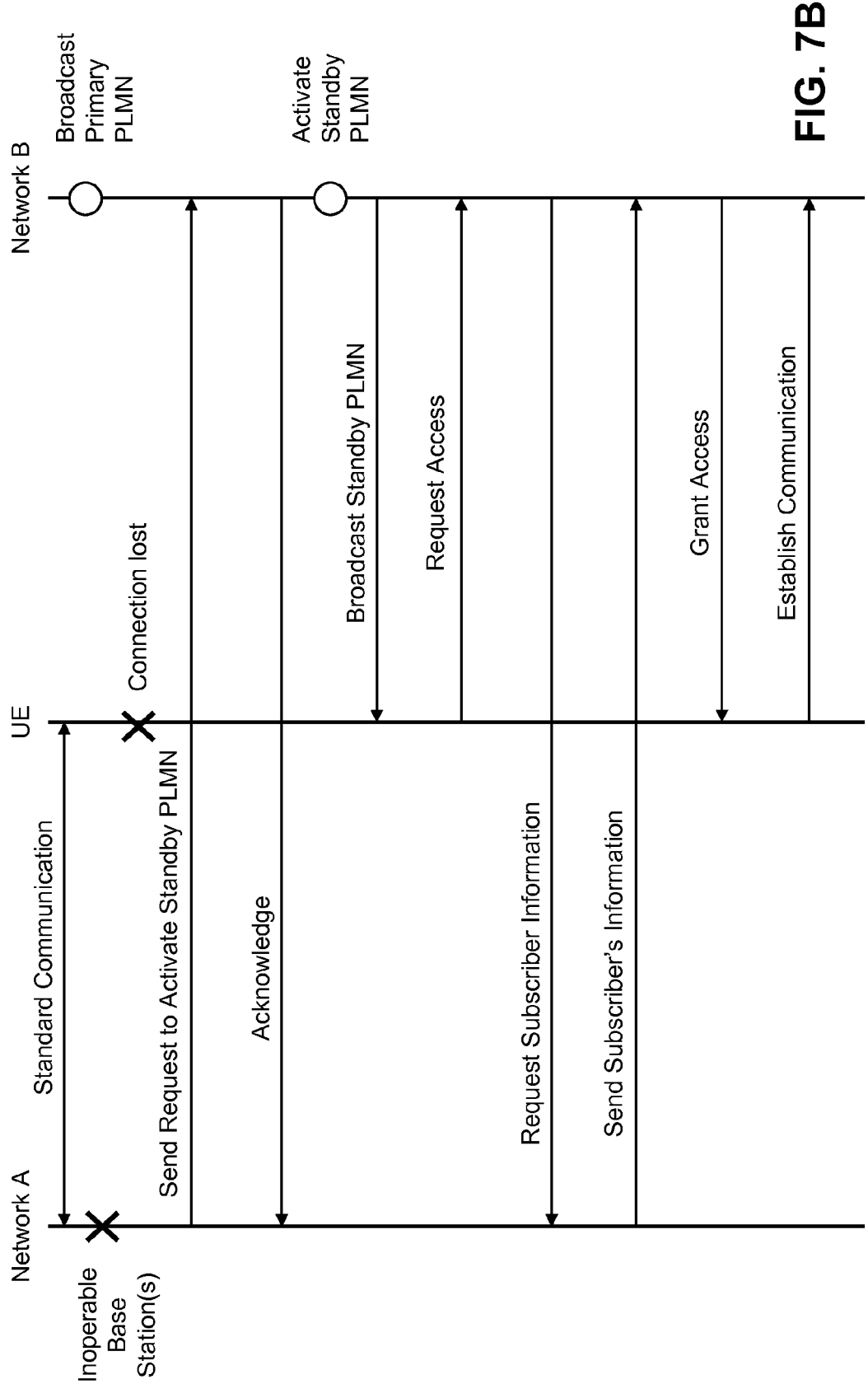
FIG. 7B is another signaling diagram illustrating a set of non-limiting example procedures between operators.

FIG. 7B is another signaling diagram illustrating a set of non-limiting example procedures between operators according an example embodiment. Initially, there are standard communications between UE and Network A (e.g., the network operated by Operator A). Standard communications between the UE and network A is between a particular base station of network A and the UE. Network A and network B are both broadcasting only primary PLMN codes.

At some later point base stations in network A may be rendered inoperable (e.g., due to a hurricane, etc). As a result of the downed base stations, the UE may loose connectivity to network A. In response to the downed base stations, an emergency trigger or request may be activated (e.g., as shown in FIG. 7A). Thus, network A sends a request to network B asking network A to activate and broadcast a standby PLMN. In response, network B activates the standby PLMN and sends an acknowledgement to network A that the standby PLMN has been activated.

It will be appreciated that the acknowledgement signal need not be sent and network A may assume that the request has been carried out. Further, in response to the acknowledgement, network A may activate its standby PLMN code.

Once the standby PLMN code has been activated, the standby PLMN is broadcast by network B. Upon receiving the newly broadcast PLMN code, the UE recognizes that the standby PLMN code is not on a list of forbidden list of networks. Alternatively, or in addition, the broadcast PLMN code may be recognized as being on a list of approved PLMN networks that it may obtain service from. Accordingly, the UE may request access (e.g., request to obtain service from) to the network broadcasting the standby PLMN code.

It will be appreciated that the UE may consider the standby PLMN code to be a "separate" network from the primary broadcast PLMN code of network B. However, the network associated with the standby PLMN code may be the same physical communications network as the communications network associated with the primary PLMN code. Thus, the "two" networks associated with the two different PLMN codes may be logically separate but physically the same. It will be appreciated that in other non-limiting embodiments, a separate physical network may be provided for a separate PLMN code.

In any event, once the UE requests access to network B, an authentication process may need to be carried out. Accordingly, network B may request subscriber information from network A (e.g., to verify that the UE is a subscriber of the operator of network A). In response to the request for information, network A may lookup the information and return the resulting subscriber information to network B. Network B then communicates the UE that access to Network B's resources have been granted. The UE now establishes a connection and operates through network B's resources even though the resources of network A have been rendered inoperable for the UE.

This implementation of a standby PLMN allows UEs to roam into a standby PLMN when their own network fails. This may be facilitated by national roaming agreements between standby PLMNs and other "regular" PLMNs. As standby PLMNs may be switched on in emergency, or the like, this may allow the setup of national roaming agreements to help achieve reliability in situations like an emergency situation. Further such agreements may not disrupt regular business and competition between operators in normal situations.

FIGS. 8A, 8B, 8C, and 8D are diagrams of non-limiting example standby PLMN implementations according to example embodiments.

Figure 8A:
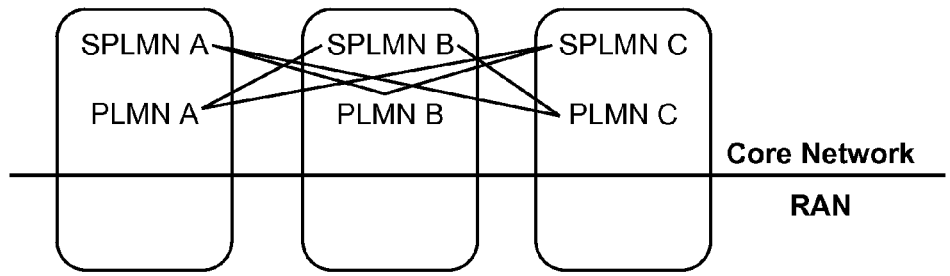
FIGS. 8A, 8B, 8C, and 8D are diagrams of non-limiting example standby PLMN embodiments.

FIG. 8A shows a non-limiting example standby PLMN (e.g., SPLMN) implementation. In this embodiment all the PLMNs (e.g., operators) define a standby PLMN as a new logical operator corresponding to the same physical PLMN. In defining a new logical operator the standby PLMN may use the same nodes as used by the "regular" PLMN. In alternative non-limiting embodiments, the SPLMN may use different physical nodes in addition to being separate logically. Furthermore, in this embodiment all operators (e.g., A, B, and C) have separate RANs and core networks.

Accordingly, the created standby PLMN may make a national roaming agreement with the other operators (e.g., as shown by the solid lines between SPLMNs and normal PLMNs). In another non-limiting example embodiment a "broker entity" may be setup to reduce the effort for setting up roaming agreement so that a "full mesh" (e.g., $O(n^2)$) of roaming agreements may be avoided.

Taking for example the agreement between SPLMN A and PLMN B. UEs of PLMN B may not be allowed to access the network resources of PLMN A. However, when SPLMN A is activated the roaming agreement (represented by the solid line) may allow UEs of PLMN B to obtain service through SPLMN A.

Figure 8B:
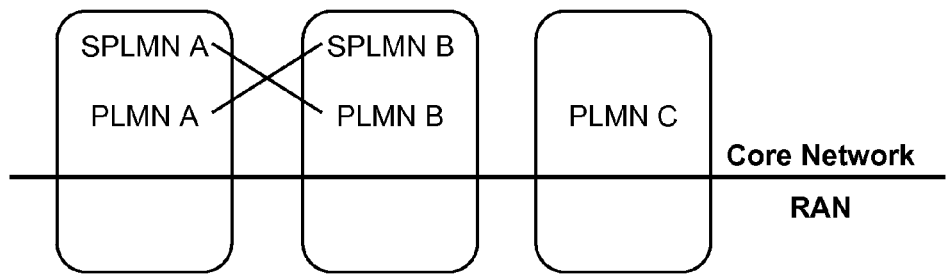

FIG. 8B shows another non-limiting example standby PLMN (e.g., SPLMN) implementation. It may be possible that roaming agreements are made between a set of operators while other operators are left out. In this case, operators may be left out and may not be able to make any roaming agreements with the standby operators. This may be because agreements may be done on a bilateral (or multilateral) basis. Accordingly, operators A and B may make a standby roaming arrangement and leave operator C alone. However, even with a limited set of operators, standby roaming agreements may still be desirable.

Figure 8C:
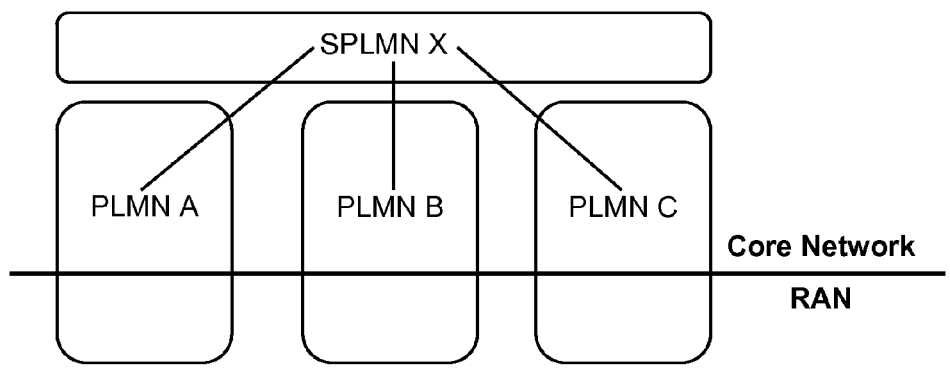

FIG. 8C shows a further non-limiting example standby PLMN (e.g., SPLMN) implementation. Here, operators may decide to run a separate core network for a Standby PLMN. This may add further core network redundancy to a system. Such an implementation may help centralize the handling of an emergency situation and share the costs thereof Further, such an implementation may require that the RANs of the individual operators are set up for network sharing between the regular PLMN and the Standby PLMN.

Figure 8D:
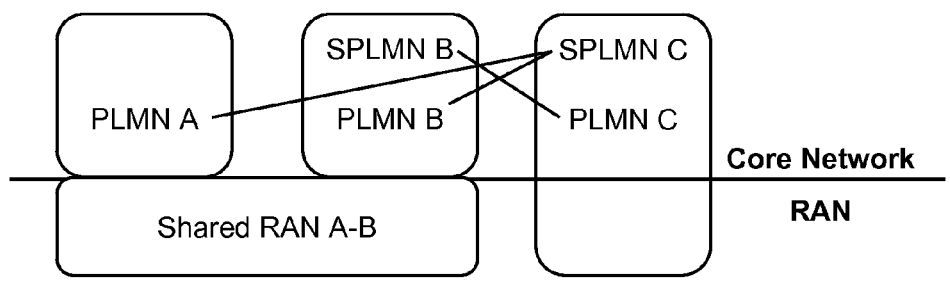

FIG. 8D shows another non-limiting example standby PLMN (e.g., SPLMN) implementation. When multiple operators share the same RAN (and associated base stations), then it may be possible for those operators to decide to run a single standby PLMN. A single standby PLMN may be implemented by one of the PLMNs as a new logical network. It will be appreciated that a separate physical standby PLMN may be implemented as well. One benefit to such an implementation may be to reduce the costs associated with a standby PLMN. Most failures may happen in the RAN of a communications network. Further, a core network may use internal redundancies to improve fault tolerance. Accordingly, a standby PLMN for shared RAN resources may be a reasonable option.

The use of national roaming in relation to the standby PLMNs may allow extended coverage for UEs whose own network fails at their current location. However, UEs may suffer performance problems when moving between a regular PLMN network and a standby PLMN network.

This may be because a UE in connected mode which moves from a good coverage area to a place with no coverage (e.g., because a base station in that area is not available) may lose connectivity before the UE may select a new network with proper coverage. This process typically takes some amount of time and may cause disruption to the end user.

Accordingly, to improve mobility performance, the RAN nodes may be configured to enable handover to the RAN of other operators in an emergency situation (e.g., from a regular PLMN operator to a standby PLMN operator). To accomplish this, RAN nodes may order UEs to also make measurements on the neighboring networks (based on pre-configured frequency bands that are sent to the terminal during the setup of measurements), and trigger a handover to the RAN of the other operator (e.g., the standby PLMN operator) based on the radio measurements. This may require that the RAN nodes be configured in a special "emergency mode" to also consider the other SPLMNs as potential targets for handover.

For idle mode mobility as well as for connected mode mobility, it is may be desirable for the operators to provide connectivity between the respective core network nodes (MMEs, SGSNs, GGSNs, SGWs and PGWs) so that the context of the registered user is transferred during a Location/Routing/Tracking area update.

The above configuration to enable mobility from one network to another may require some work to fully set up and maintain. Further, such a setup may also require a degree of trust between operators (e.g., they may need to exchange security keys between core network entities). However, a similar type of configuration may take place near the network border even in normal circumstances, as more and more users may desire a seamless handover from one network to a neighboring network as they walk or drive through a national border (e.g., between the U.S. and Canada, or between member states of the European Union). Further, operators may re-use experiences from these types of network configuration settings.

Certain non-limiting example embodiments may be applied to LTE and 3G networks. Certain non-limiting example embodiments may be applied to both circuit-switched and packet-switched services. Certain non-limiting example embodiments may use network sharing in 3G and may be applied to both supporting UEs and non-supporting UEs.

As discussed above, certain non-limiting example embodiments may use a network configuration where the same physical node may belong to two logical networks: the normal PLMN and the standby PLMN. Such a configuration may apply to signaling nodes such as a Serving GPRS Support Node (SGSN) or a Mobility Management Entity (MME), or to user plane nodes such as a Gateway GPRS Support Node (GGSN) or a Public Data Network (PDN) Gateway (GW). This is facilitated by configuring a node with a logical Standby PLMN in addition to the primary PLMN. If a standby PLMN is used, a Home Subscriber Server (HSS) node may still correspond to the home PLMN as the user is in a roaming situation. The subscription may be configured so that it allows for a roaming scenario, with the logical standby PLMN providing GW functionality (e.g., Visited Address Allowed flag should be turned on).

The principles described above may apply to different types of communication networks. Non-3GPP networks such as wireless local area networks (WLAN) may provide further capacity and coverage for 3GPP mobile networks for UEs that support the given non-3GPP access technology. Non-3GPP networks may access and be connected to a 3GPP network. This may allow, for example, a single non-3GPP access point to provide access for multiple PLMNs. In certain example non-limiting embodiments the deployment of non-3GPP access points (e.g., WLANs) may provide redundancy for a PLMN operator. Such implementations may allow for access to the same network in multiple ways. Accordingly, if one access technique fails, a back-up option may be used to access the same network.

In certain example non-limiting embodiments, operators may have their own non-3GPP access deployments. Accordingly, it may be possible to share the non-3GPP access during an emergency situation in a similar way as for 3GPP accesses. During an emergency situation (e.g., when a standby PLMN is turned on), the non-3GPP access may also connect to other operators. This may require a reconfiguration of the non-3GPP access points to facilitate connection to the new operators. Such an implementation may not require a new PLMN code, as the non-3GPP access can provide a list of accessible operators to the UE.

One example technique of carrying out such an implementation may be to use WLANs that are capable of advertising more than one SSID (Service Set ID). As such, the broadcast SSIDs may be used to advertise available operators via a WLAN. Such an implementation may improve the discoverability of available networks. It will be appreciated that the use of a new SSID may not be required as multiple operators may be reached through one SSID.

In certain non-limiting example embodiments, an "emergency indicator flag" may be used in a system broadcast channel. Such an indicator could be the same as is used for the Earthquake and Tsunami Warning System, or it could be a different indicator. When UEs detect the broadcast an emergency indicator flag, they may override the regular PLMN selection criteria, and select a PLMN that is on the Forbidden PLMN list. Alternatively, or in addition, operators may define a PLMN selection list that applies to such emergencies. Such an emergency PLMN selection list could by configured by an Access Network Selection and Discovery Function (ANDSF) or other protocols. Accordingly, national roaming in emergency situations may be enabled for non-supporting networks (e.g., 2G networks).

In a non-limiting example embodiment an emergency roaming agreement may need to be setup before activation. A new UE function may be needed to listen to the new broadcast flag. Such an implementation may override the normal PLMN selection rules under emergency. It will be appreciated that such an implementation may not be practical for legacy UEs (e.g., as they would not be able to handle the new UE function).

In another non-limiting example embodiment, a UE could provide an "emergency button" for the user with the purpose of overriding normal network selection rules and try networks that are normally forbidden.

In a further non-limiting example embodiment, as an alternative to adding the standby PLMN to the list of supported PLMNs in the RAN, the primary PLMN advertised by RAN may be replaced with the Standby PLMN.

In summary, the technology described herein increases the reliability of mobile network access through the use of standby PLMNs and the like in situations like those described in the background.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke 35 U.S.C. §112, 6$^{th}$ paragraph unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A radio communications node in a first radio communications network operated by a primary public land mobile network (PLMN) operator to provide first radio communications service to first mobile user equipment terminals subscribed to the primary PLMN operator during a first normal mode of operation, the node comprising:
    radio circuitry configured to broadcast a primary radio network code associated with the primary PLMN operator which indicates that the first mobile user equipment terminals may obtain the first radio communications service provided from the primary PLMN operator; and
    a receiver configured to receive an instruction to broadcast a standby radio network code,
    wherein a second different PLMN operator provides second radio communications service during the first normal mode of operation to second mobile user equipment terminals subscribed to the second PLMN operator,
    wherein the second mobile user equipment terminals are not allowed to obtain normal subscription service from the primary PLMN operator during the first normal mode of operation,
    wherein the receiver is configured, in response to the received instruction, to enter a standby mode of operation and to cause the radio circuitry to broadcast both the primary radio network code and the standby radio network code to permit one or more of the second mobile user equipment terminals to obtain the first radio communications service from the primary PLMN operator during the standby mode of operation.

2. The radio communications node of claim 1, wherein the first radio communications service from the primary PLMN operator includes using first radio resources allocated to the primary radio network operator and the second radio communications service from the second PLMN operator includes using second radio resources that are at least partially different from the first radio resources.

3. The radio communications node of claim 1, wherein the second PLMN operator operates a second radio communications network, and wherein the standby mode of operation corresponds to an emergency situation where one or more radio communications nodes in the first radio communications network and/or in the second radio communications network are no longer available.

4. The radio communications node of claim 1, wherein the standby radio network code is associated with a standby PLMN identifier.

5. The radio communications node of claim 1, further comprising mobility management circuitry configured to coordinate mobility during the standby mode of operation to facilitate handover of ongoing mobile user equipment terminal communications between at least one communication node of the primary PLMN operator and at least one communication node of the second PLMN operator.

6. The radio communications node of claim 1, wherein the second PLMN operator operates a second radio communications network, and wherein the first radio communications network and the second radio communications network are logical networks.

7. The radio communications node of claim 1, wherein the second PLMN operator operates a second radio communications network, and wherein the first radio communications network and the second communications network are different types and use different radio access technologies.

8. The radio communications node of claim 1, wherein the standby radio network code is an emergency indicator flag that instructs second mobile user equipment terminals to override a standard radio communications network selection process.

9. The radio communications node of claim 1, wherein the standby code is used by the primary PLMN operator and related to the second PLMN operator through a standby roaming agreement.

10. A controller node configured to interact with a first radio communications network operated by a primary PLMN operator, the controller node operable to communicate with at least one radio communications node of the first radio communications network, the at least one radio communications node configured to broadcast a primary radio network code associated with the primary PLMN operator during a normal operational mode, the controller node comprising:
    a communications interface adapted to send an instruction to the at least one radio communication node to enter a standby mode and to broadcast a standby radio network code,
    wherein the primary PLMN operator provides radio communications service during the normal operational mode to first mobile user equipment terminals that are primary PLMN operator subscribers,
    wherein a second PLMN operator provides radio communications service during the normal operational mode to second mobile user equipment terminals that are second PLMN operator subscribers, and
    wherein the second mobile user equipment terminals are excluded from obtaining the radio communications service of the primary PLMN operator during the normal operational mode but are allowed to access the radio communications service of the primary PLMN operator during the standby mode.

11. The controller node of claim 10, further comprising a communications network fault determiner, the communications network fault determiner configured to automatically send the instruction to the at least one radio communication node when a fault is detected in the first radio communications network.

12. The controller node of claim 10, wherein the second mobile user equipment terminals are allowed to obtain a non-subscription radio communications service from the primary PLMN operator in the normal operation mode.

13. The controller node of claim 10, wherein the controller node is located in one of an O&M node, a core network node, or a radio network control node.

14. The controller node of claim 10, further comprising an external interface configured to send a request to the second PLMN operator to activate a second standby mode to broadcast a second standby code, wherein the first mobile user equipment terminals are allowed to access a second radio communications service of the second PLMN operator during the second standby mode.

15. A method of increasing reliability of access to a radio communications network for mobile user equipment terminals, the method comprising:
  establishing a first primary radio network code associated with a first PLMN operator that provides radio communications service to first mobile user equipment terminals that are subscribed to the first PLMN operator, the first PLMN operator operating a first radio communications network;
  establishing a standby radio network code that is associated with the first PLMN operator and related to a second PLMN operator, the second PLMN operator providing radio communications service to second mobile user equipment terminals that are subscribed to the second radio communications operator, the second PLMN operator operating a second radio communications network;
  broadcasting the first primary radio network code;
  activating a standby mode;
  broadcasting the standby radio network code in response to activating the standby mode;
  denying normal subscription service to the first PLMN operator for the second mobile user equipment terminals when the standby mode is inactive; and
  providing service from the first PLMN operator for the second mobile user equipment terminals when the standby mode is active.

16. The method of claim 15, wherein activating the standby mode is controlled automatically.

17. The method of claim 16, wherein activating the standby mode is automatically determined when a predetermined percentage of network nodes in the first radio communications network become inoperative.

18. The method of claim 15, wherein, in response to activating the standby mode, the first PLMN operator sends a request to the second PLMN operator to broadcast a second standby code, the second standby code to facilitate first mobile user equipment terminals to obtain service from the second PLMN operator.

19. The method of claim 15, wherein activating the standby mode is done in response to a request from the second PLMN operator to activate the standby mode.

20. The method of claim 15, wherein the first communications network includes a first core network component and a first radio access network component, and wherein the standby radio network code is associated with a standby core network component that is at least partially separate from the first core network component.

21. The method of claim 20, wherein the standby core network is logically separate from the first radio communications network, but is physically the same as at least some of the first radio communications network.

* * * * *